3,799,980
PROCESS FOR PRODUCING CITRIC ACID

Kiyoshi Nara, Kyoto, Kazuhiko Ohta, Osami Yamazaki, and Hideo Fukuda, Osaka, Japan, assignors to Takeda Chemical Industries, Ltd., Osaka, Japan
Filed Sept. 10, 1971, Ser. No. 179,412
Claims priority, application Japan, Sept. 11, 1970, 45/80,246
Int. Cl. C07c 59/16
U.S. Cl. 260—535 P      4 Claims

ABSTRACT OF THE DISCLOSURE

Citric acid is separated from admixture with L(+)-isocitric acid by adding sulfuric acid to an aqueous solution containing citric acid and L(+)-isocitric acid until the amount of sulfuric acid present in the aqueous solution is 40 to 50% of the weight of L(+)-isocitric present; the solution is concentrated whereby the citric acid crystallizes out and the thus crystallized citric acid is recovered.

---

This invention relates to a process for recovering citric acid from an aqueous solution containing citric acid and L(+) isocitric acid.

Citric acid is of great demand as a sour flavoring. Recently it has become known that this acid is produced in a large scale by a certain yeast. In the production of citric acid by yeast, however, L(+) isocitric acid is practically accumulated at the same time, and in this case it is necessary to separate citric acid from L(+) isocitric acid.

In order to separate citric acid from L(+) isocitric acid by utilizing the difference in solubilities between them, an aqueous solution containing citric acid and L(+) isocitric acid is treated as follows: that is the solution is concentrated under reduced pressure in a circulating evaporator, the concentrate is transferred to a crystallizer, and further concentrated at an inner temperature of 40° C.–50° C. When the concentration reaches so high as to precipitate initial crystals, the temperature is maintained a few degrees below 36.6° C. which is the critical transition temperature. The crude crystals are collected by subjecting the slurry to centrifugation. The mother liquor as well as washings of crude crystals are reconcentrated to obtain a second crop of crystals. In the same manner a third crop is obtained.

It was found out that if the crystallization is further repeated, accumulation of L(+) isocitric acid increases to raise the viscosity of the slurry, which makes the crystallization velocity of citric acid low, makes the crystal size smaller and makes the separation of the crystals difficult, resulting in a very poor yield of citric acid.

Especially, in case of a continuous process for crystallizing citric acid which is suitable to the production on an industrial scale, the mother liquor which is left after recovering citric acid crystals and generally contains a large amount of L(+) isocitric acid is used to recycle as a solvent for crystallizing citric acid. So the situation which is described above is worsened.

The present inventors have carried out an intensive study to recover citric acid from the aqueous solution containing L(+) isocitric acid in good yield with an industrial advantage, even when L(+) isocitric acid remains in the solution at a considerably high concentration and obtained the following findings:

(1) L(+) isocitric acid has an action of remarkably lowering the solubility of citric acid in water and in sulfuric acid aqueous solution.

Figure 1:
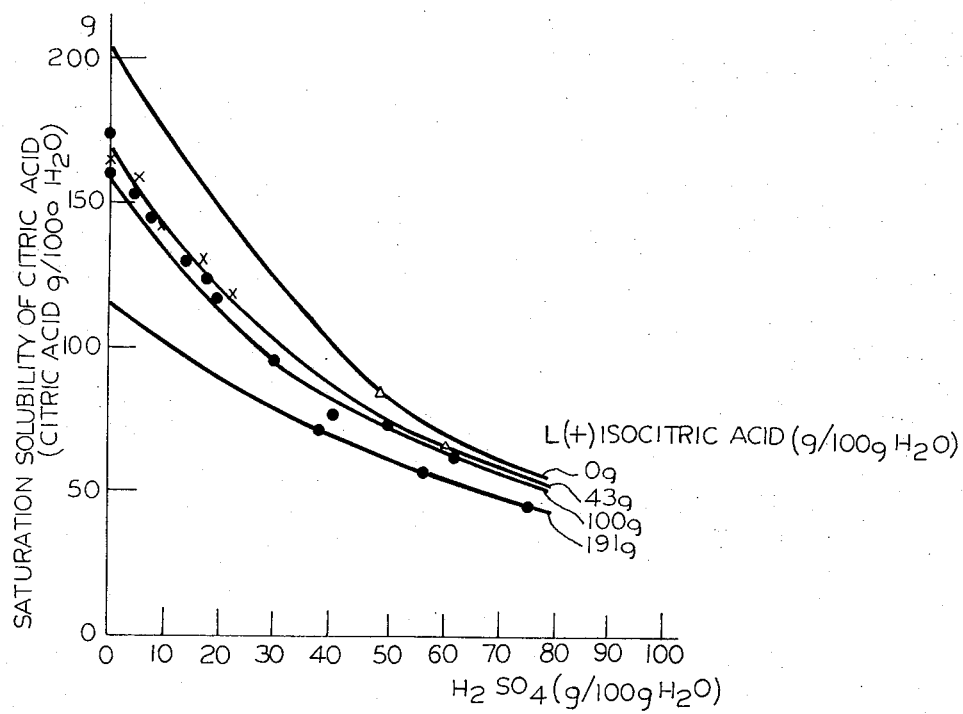

The relation is illustrated in FIG. 1 which indicates a variation of the saturated solubility of citric acid (at 30° C.) by adding L(+) isocitric acid and sulfuric acid.

(2) Citric acid slurry containing L(+) isocitric acid increases its viscosity as its concentration is raised. This high viscosity can be lowered by the addition of sulfuric acid.

Figure 2:
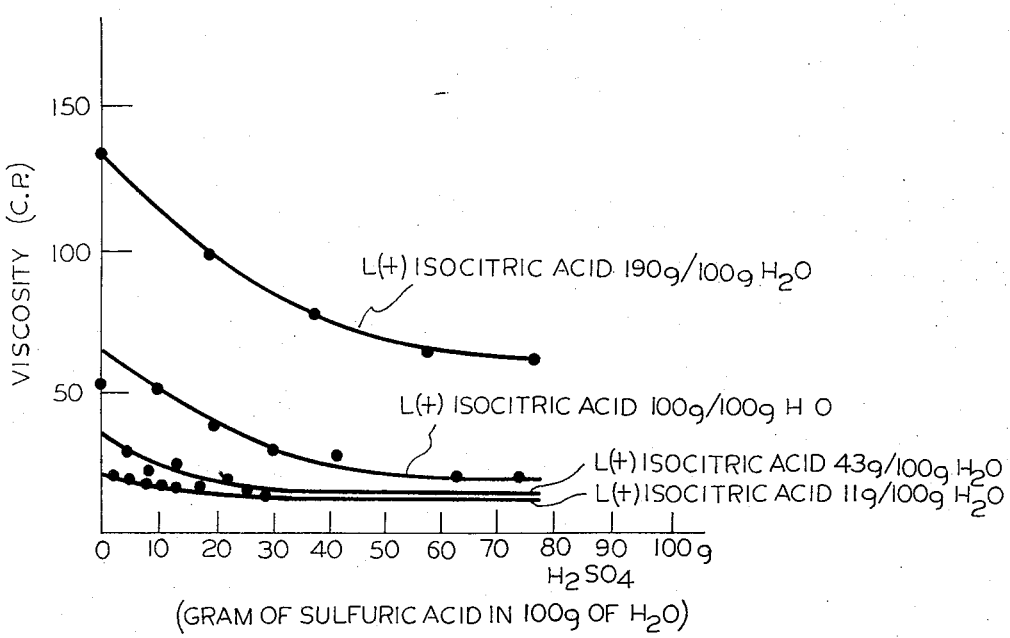

This relation is illustrated in FIG. 2 which indicates a variation of viscosity of the saturated citric acid solution (at 30° C.) by adding L(+) isocitric acid and sulfuric acid.

Figure 3:
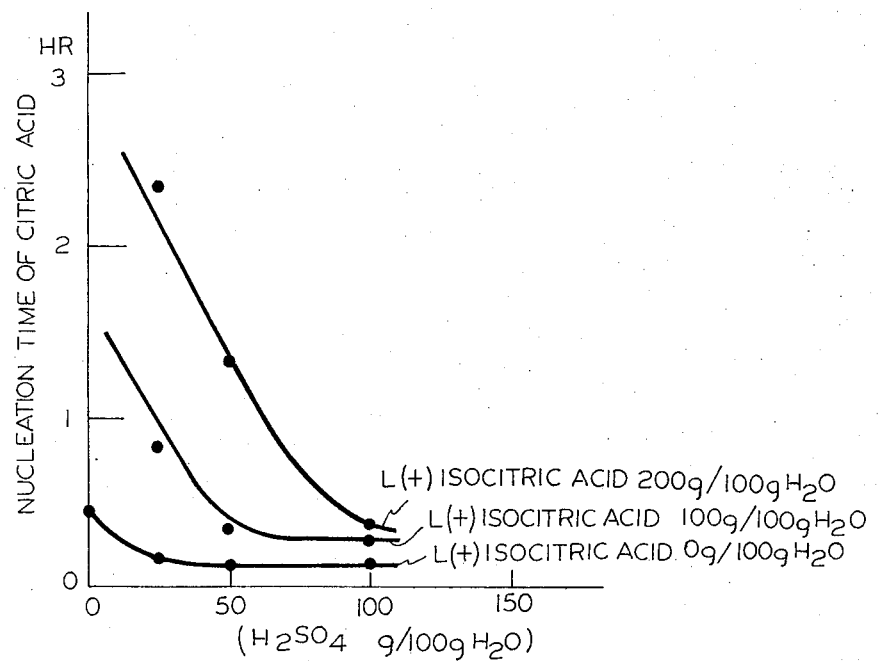

(3) L(+) isocitric acid has an action of suppressing nucleation ability of citric acid, but the addition of sulfuric acid can restore the ability. This relation is illustrated in FIG. 3 which indicates the time required for the formation of citric acid nuclei (initial crystals) in the following tests:

15 kinds of solutions are prepared by dissolving citric acid (100 g.) in water (100 g.) under heating, adding respectively L(+) isocitric acid (0 g., 100 g., 200 g.) and adding moreover respectively sulfuric acid (0 g., 50 g., 100 g.), these solutions are agitated gently.

(4) L(+) isocitric acid acts to suppress the decomposition of citric acid with sulfuric acid, as shown in Table 1.

TABLE 1

The effect of L(+) isocitric acid to prevent citric acid from decomposition by sulfuric acid

| Amount of L(+) isocitric acid (L(+) isocitric acid, g./100 g. $H_2O$): | Concentration of sulfuric acid ($H_2SO_4$, g./100g. $H_2O$) | | | | | | | | |
|---|---|---|---|---|---|---|---|---|---|
| | 0 | 10 | 20 | 30 | 40 | 50 | 60 | 70 | 80 |
| 0 | − | − | ± | + | + | + | + | + | + |
| 20 | − | − | − | ± | + | + | + | + | + |
| 40 | − | − | − | ± | + | + | + | + | + |
| 60 | − | − | − | − | ± | + | + | + | + |
| 80 | − | − | − | − | − | + | ± | + | + |
| 100 | − | − | − | − | − | − | ± | + | + |
| 120 | − | − | − | − | − | − | − | ± | + |
| 140 | − | − | − | − | − | − | − | − | ± |
| 160 | − | − | − | − | − | − | − | − | − |

Each test solution whose formulation is shown in Table 1 was heated on a boiling water bath for 1 hour and the decomposition of citric acid was examined by carbon monoxide originating therefrom. + illustrates that generation of carbon monoxide was observed in a test solution and − illustrates that no generation of carbon monoxide was observed.

Table 1 proves that if L(+) isocitric acid is present and sulfuric acid is less than 50 percent of L(+) isocitric acid, citric acid is not decomposed by sulfuric acid even at such a high concentration of sulfuric acid as 80 g./100 g. $H_2O$.

The above-mentioned finding shows that it is very effective to allow sulfuric acid to be present when crystallizing citric acid from a solution containing L(+) isocitric acid.

The amount of sulfuric acid is, when taking into consideration avoidance of so high viscosity of the crystallization system, desirable to be almost the same as that of L(+) isocitric acid.

On the other hand, when the amount of L(+) isocitric acid which is capable of preventing the coexisting citric acid from being decomposed by sulfuric acid, the amount of sulfuric acid is required to be less than 50% (w./w.) of the coexisting L(+) isocitric acid, and for the purpose of restoring the nucleation of citric acid, it is required that the amount of sulfuric acid is not less than 40% (w./w.) of the coexisting L(+) isocitric acid.

It has, thus, been found that, to obtain the highest possible yield, the amount of sulfuric acid should range from 40% (w./w.) to 50% (w./w.) of the amount of L(+) isocitric acid.

Therefore, when crystallization of citric acid from an aqueous solution containing citric acid and L(+) isocitric acid is intended, addition of sulfuric acid to the aqueous solution at 40–50 w./w. percent relative to the amount of L(+) isocitric acid serves to attain the purpose regardless of employing batch-wise or continuous crystallizing method.

It is known that sulfuric acid accelerates growth of citric acid crystals, for example, as described in the Japanese Patent Publication Gazette No. 5526/70, which states "as an excess amount of sulfuric acid was used for accelerating to separate citric acid crystals in an aqueous solution of citric acid, there were encountered various disadvantages namely, the aqueous solution of citric acid was extensively colored and decomposed so that the yield was adversely affected and the output reduced.

Moreover, an increased amount of mother liquor had to be treated and the operation became costly. In addition, crystals of citric acid tended to coagulate and cake. The study conducted to overcome those disadvantages led to the finding that carbon dioxide gas was superior to sulfuric acid."

However, because sulfuric acid decomposes citric acid, the technique of adding sulfuric acid in the crystallization of citric acid has not been practiced as yet.

Accordingly, it was naturally anticipated that even when crystallizing citric acid from an aqueous solution containing citric acid and L(+) isocitric acid, sulfuric acid would decompose the citric acid and lower its yield.

But it was found that, if sulfuric acid is present in a weight of 40–50% relative to L(+) isocitric acid, even repeated concentrations do not allow L(+) isocitric acid to crystallize, and that, when the concentration of L(+) isocitric acid in the aqueous solution reaches about 160 g. relative to 100 g. of water, that is about 50% (w./w.) relative to the total weight of the aqueous solution, further concentration is hardly feasible and the concentration of sulfuric acid does not become higher than about 80 g./100 g. $H_2O$, that is 20–25% (w./w.) relative to the total weight of the aqueous solution, resulting in causing no decomposition of citric acid whose concentration reaches about 60 g./100 g. $H_2O$ as shown in FIG. 1, namely when the spot is taken corresponding to 160 g./100 g. $H_2O$ concentration of L(+) isocitric acid at 80 g./100 g. $H_2O$ concentration of sulfuric acid, the saturation solubility of citric acid reads as 60 g./100 g. $H_2O$.

For example, test solutions, which are prepared by adding citric acid in various concentrations to aqueous solution containing about 80 parts by weight of sulfuric acid and about 160 parts by weight of L(+) isocitric acid in 100 parts by weight of water, are heated at 100° C. for 1 hour, and the decomposition of citric acid does not occur in any instance.

In contrast, with a solution containing citric acid and sulfuric acid but no L(+) isocitric acid, a vigorous decomposition of citric acid takes place.

Moreover, it becomes easy to separate citric acid from a concentrated solution of citric acid containing a large amount of L(+) isocitric acid, because the saturation solubility of citric acid in that solution does not increase but decreases as the concentration of L(+) isocitric acid increases.

This invention was completed on the basis of the above-mentioned new findings which were unexpected from the conventional knowledge.

If desired, L(+) isocitric acid, which is useful as for example a biochemical reagent also, may be recovered from the mother liquor remaining after the recovery of citric acid by the routine manner such as precipitating as calcium salt.

Thus, the present invention establishes a method for recovering citric acid and L(+) isocitric acid respectively in high yields on a commercial scale from an aqueous solution of citric acid and L(+) isocitric acid which is obtainable from the cultured broth containing citric acid and L(+) isocitric acid.

Namely, this invention utilizes especially for separating citric acid from the broth obtained by cultivation of a certain yeast capable of producing, citric acid and L(+) isocitric acid, such as *Candida lipolytica*, *Candida tropicalis*, *Candida intermedia*, *Candida parapsilosis*, *Candida guilliermondii* and *Candida parapsilosi*, *Hansenula subpelliculosa* and *Debaryomyces klockeri*, the above cultivation method being explained in detail in, for example, British Pat. No. 1199700, French Pat. No. 1596056 and Belgian Pat. No. 725417.

Additionally stating, an aqueous solution of citric acid and L(+) isocitric acid is generally obtained by the following method. That is, a certain species of yeast which is capable of producing citric acid and L(+) isocitric acid is cultivated. Calcium hydroxide is added to the filtrate which is obtained upon removal of the yeast cells from the cultured broth and contains citric acid and L(+) isocitric acid. Calcium citrate and calcium L(+) isocitrate are produced and recovered by filtration from the reaction mixture, and preferably after treating with cation-exchange resin (e.g. Amberlite IR120B Rohm & Haas Co. U.S.A.), Dow EX50W–X8 (Dow Chemical Corp. U.S.A.) Permutit 9 (The Permutit Co. U.S.A. and/or active carbon, they are suspended in water, and sulfuric acid is added to the suspension, whereby free citric acid and L(+) isocitric acid as well as calcium sulfate are produced.

As the starting material in the method of this invention, the aqueous solution separated from the precipitating calcium sulfate is employed. It is not deniable that the starting aqueous solution still contains sulfuric acid originating from the calcium sulfate.

But, the amount of sulfuric acid is so small, i.e. not more than 2–3% of the L(+) isocitric acid content, that it is necessary to add a large amount of sulfuric acid to the aqueous solution in order to raise the concentration of sulfuric acid until the amount of sulfuric acid attains 40–50% of the L(+) isocitric acid content.

The following examples are intended merely to illustrate presently preferred embodiments of this invention and not to restrict the scope thereof.

In the present specification as well as in the following examples, the abbreviations "mg.," "g.," "kg." and "° C." respectively refer to milligram(s), gram(s), kilogram(s) and degrees centigrade, and percentages are weight/volume unless otherwise described.

EXAMPLE 1

*Candida* sp. (ATCC 20238) is cultivated in a medium containing n-hexadecane (8%) $NH_4Cl$ (0.3%), $KH_2PO_4$ (0.05%), $MgSO_4 \cdot 7H_2O$ (0.05%) and Vitamin $B_1$ (50 γ/l.) at 28° C. for 72 hours, the pH of the medium being maintained at 6.5 by the addition of ammonia. To 100 parts by volume of filtrate, which is obtained upon removal of the yeast cells from the cultured broth and contains citric acid (50 mg./ml.) and L(+) isocitric acid (50.5 mg./ml.), 6.4 parts by weight of $Ca(OH)_2$ is added. The reaction is allowed to proceed at 85°–90° C. for 2 hours, at the end of which time the precipitated calcium salt, which is recovered by filtration, is then washed with water and suspended in water. The suspension is adjusted to pH 1.5 with $H_2SO_4$. The sediment thus formed is filtered off and washed with a small amount of water.

The washings are combined with the filtrate, and the mixture is passed through a column of Amberlite IR–210B (Rohm & Haas Co. U.S.A.) to remove the calcium ion and, then, decolorized with activated carbon, whereby 100 parts by volume of the purified filtrate (hereinafter I) containing L(+) isocitric acid (44.5 mg./ml.), citric acid (45 mg./ml.) and sulfuric acid (1.5 mg./ml.) is obtained. To this purified filtrate (I) sulfuric acid in an amount of 20.8 mg./ml. is added so that the concentration of sulfuric acid is 22.3 mg./ml. which is about 50% of the concentration of L(+) isocitric acid (i.e. 44.5 mg./ml.) in the said filtrate. The mixture is concentrated to 50° C. under reduced pressure until the concentration of citric acid reaches about 50 g. relative to 100 g. of water, and is subjected to vacuum crystallization in a batch-wise vacuum crystallizer at a temperature of 30°–35° C. The crystals of citric acid, which precipitate out as the concentration proceeds, are separated by centrifugation, and the other liquor is further concentrated to allow citric acid to crystallize until no more concentration proceeds (concentration of L(+) isocitric acid reaches about 50%). This resulting concentrate is cooled at 5° C. for 24 hours, whereby citric acid crystals are obtained. The total amount of citric acid which has been obtained up to this stage is 3.5 parts by weight as monohydrate, and the crystallization yield from the purified filtrate (I) is 71% of the theoretical value. The amount of the resulting mother liquor is 10.4 parts by weight and is composed of 2.2 parts by weight of $H_2SO_4$, 2.5 parts by weight of $H_2O$, 1.3 part by weight of citric acid and 4.4 parts by weight of L(+) isocitric acid. The pH of this mother liquor is adjusted to 3.5 with potassium hydroxide and L(+) isocitric acid is recovered as monopotassium salt, when yield is 4.2 parts by weight.

As a control, 100 parts by volume of the purified filtrate (I) containing 1.5 mg./ml. sulfuric acid, 44.5 mg./ml. L(+) isocitric acid and 45 mg./ml. citric acid is subjected to batchwise vacuum crystallization, whereupon the viscosity of the solution is increased so that only small amount of fine citric acid crystals are separated.

The other liquor remaining after the recovery of crystals is cooled at 5° C. for a week, whereby obtained citric acid crystals which can be hardly separated out by filtration.

EXAMPLE 2

Candida sp. (ATCC 20238) is cultivated in a medium containing n-hexadecane (8%), $NH_4Cl$ (0.3%), $KH_2PO_4$ (0.05%), $MgSO_4 \cdot 7H_2O$ (0.05%) and Vitamin $B_1$ (50 $\gamma$/l.), at 28° C. for 72 hours, with the pH of the medium being maintained 6.5 with ammonia. To 1000 parts by volume of filtrate, which is obtained upon removal of the yeast cells from the cultured broth and contains citric acid (83 mg./ml.) and L(+) isocitric acid (18 mg./ml.), 64 parts by weight of $Ca(OH)_2$ is added. The reaction is allowed to proceed at 85°–90° C. for 2 hours. The resulting calcium salts are recovered by filtration with a filter press. The salts are washed with water and suspended in water, followed by the addition of $H_2SO_4$ to the suspension to pH 1.5.

The precipitated calcium sulfate is recovered by filtration and washed with a small amount of water, and the pool is passed through a column of Dow XX50W-X80 (Dow Chemical Co. in U.S.A.) to remove the calcium ion, and, then, through a column of activated carbon to decolorize, whereby 1000 parts by volume of the purified filtrate (hereinafter II) containing L(+) isocitric acid (11.4 mg./ml.), citric acid (79 mg./ml.) and sulfuric acid (1.5 mg./ml.) is obtained.

To this purified filtrate (II) sulfuric acid in an amount of 3.1 mg./ml. is added so that the concentration of sulfuric acid is 4.6 mg./ml. which is about 40% of the concentration of L(+) isocitric acid (i.e. 11.4 mg./ml.) in the said filtrate.

The mixture is concentrated at 50° C. under reduced pressure until the concentration of citric acid reaches about 50 g. relative to 100 g. of water, and is treated to vacuum crystallization in a batch-wise vacuum crystallizer at a temperature of 30°–35° C. The crystals of citric acid, which precipitate out as the concentration proceeds, are separated by centrifugation, and the mother liquor is further concentrated to allow citric acid to crystallize until no more concentration proceeds (concentration of L(+) isocitric acid reaches about 50%).

This resulting concentrate is cooled at 5° C. for 24 hours, whereupon an additional amount of citric acid crystals is obtained. The total amount of citric acid thus obtained is 80.0 parts by weight as monohydrate and the crystallization yield from the purified filtrate (II) is 93% of theoretical. The amount of the resulting mother liquor is 33 parts by weight and is composed of 4.5 parts by weight of $H_2SO_4$, 11.4 parts by weight of L(+) isocitric acid, 6 parts by weight of citric acid and 12 parts by weight of $H_2O$. To this mother liquor KOH is added, whereby monopotassium L(+) isocitrate (11.2 parts by weight) is obtained by a conventional procedure.

As a control, 1000 parts by volume of the purified filtrate (II) of 11.4 mg./ml. L(+) isocitric acid and 79 mg./ml. citric acid which, however contains only 1.5 mg./ml. sulfuric acid is similarly subjected to batchwise vacuum crystallization and the crystals of citric acid are recovered.

It is found that as the solution is concentrated, the viscosity of the solution is increased, the growth of crystals becomes retarded and the size of crystals gets too small so that it becomes difficult to separate out the crystals from the mother liquor.

Moreover, the amount of citric acid crystals obtained is 65.0 parts by weight as monohydrate, and the crystallization yield from the purified filtrate (II) is as low as 75% of the theoretical.

To this mother liquor is added potassium hydroxide and the L(+) isocitric acid is crystallized and recovered as monopotassium salt in the conventional manner. The amount of monopotassium L(+) isocitrate thus obtained is 10.5 parts by weight (80% of theoretical yield).

EXAMPLE 3

1000 liters of an aqueous solution containing, as added, sulfuric acid (5.7 mg./ml.) in the amount corresponding to 50% (weight) of the amount of L(+) isocitric acid, citric acid (79 mg./ml.) and L(+) isocitric acid (11.4 mg./ml.) is continuously fed to a continuous vacuum crystallizer (5 liters capacity), in which continuous crystallization of citric acid is carried out at a liquid temperature of 30°–35° C.

The citric acid crystals are continuously separated out by centrifugation and 20% of the mother liquor is withdrawn. The remaining 80% is fed back to the crystallizer, and vacuum crystallization is further continued.

The mother liquor withdrawn is separately subjected to crystallization by cooling at 5° C. In all, 79 kg. of citric acid monohydrate is obtained. (92% of theoretical yield).

As a control, 1000 liters of an aqueous solution which contains L(+) isocitric acid and citric acid but which does not contain sulfuric acid L(+) isocitric acid (11.4 mg./ml.) and citric acid (79 mg./ml.) is similarly subjected to continuous vacuum crystallization. It is found that, as the mother liquor is recycled, the viscosity of the solution is increased and the growth of citric acid crystals retarded so that crystallization cannot be further continued.

What we claim is:

1. A process for separating citric acid from admixture with L(+)-isocitric acid which comprises adding sulfuric acid to an aqueous solution containing citric aid and L(+)-isocitric acid obtained by culturing a yeast capable of producing a mixture of citric acid and L(+)-isocitric acid until the amount of sulfuric acid present in the aqueous solution corresponds to 40 to 50 percent of the weight of L(+)-isocitric acid present, concentrating the solution whereby the citric acid crystallizes, and recovering the thus crystallized citric acid from the solution.

2. A process according to claim 1, wherein said aqueous solution containing citric acid and L(+)-isocitric acid is one which is obtained by cultivating a yeast capable of producing citric acid and L(+)-isocitric acid, removing the cells from the resulting culture broth, adding calcium hyroxide to the cell-free broth, suspending the calcium salts of citric acid and L(+)-isocitric acid in water, and adding sulfuric acid to the suspension to convert the calcium salts to the free acids.

3. A process according to claim 1, wherein concentration of the solution is carried out under reduced pressure until the concentration of citric acid reaches about 50 parts by weight relative to 100 parts by weight of water, feeding the thus obtained solution to a vacuum crystallizer and carrying out the vacuum crystallization until the concentration of L(+)-isocitric acid reaches about 50% so that no further concentration of the mother liquor is possible.

4. A process according to claim 3, wherein the first concentration of the solution is carried out at about 30–60° C. and the vacuum crystallization is carried out at 30–35° C.

References Cited
FOREIGN PATENTS 802,522   10/1958   Great Britain ----- 260—553 P LORRAINE A. WEINBERGER, Examiner P. J. KILLOS, Assistant Examiner